(No Model.) 9 Sheets—Sheet 1.

L. J. CRECELIUS & H. G. SACHLEBEN.
BARB WIRE MACHINE.

No. 350,413. Patented Oct. 5, 1886.

Attest:
Wm. N. Pearce
Chas. A. Gauting

Inventors:
Louis J. Crecelius
Henry G. Sachleben (No Model.) 9 Sheets—Sheet 2.

L. J. CRECELIUS & H. G. SACHLEBEN.
BARB WIRE MACHINE.

No. 350,413. Patented Oct. 5, 1886.

Attest:
Wm. H. Pearce
Chas. A. Gauntt

Inventors;
Louis J. Crecelius
Henry G. Sachleben (No Model.) 9 Sheets—Sheet 3.

L. J. CRECELIUS & H. G. SACHLEBEN.
BARB WIRE MACHINE.

No. 350,413. Patented Oct. 5, 1886.

Attest: Inventors (No Model.) 9 Sheets—Sheet 4.

L. J. CRECELIUS & H. G. SACHLEBEN.
BARB WIRE MACHINE.

No. 350,413. Patented Oct. 5, 1886.

Attest: Inventors;

(No Model.) 9 Sheets—Sheet 6.

L. J. CRECELIUS & H. G. SACHLEBEN.
BARB WIRE MACHINE.

No. 350,413. Patented Oct. 5, 1886.

Attest:
W. W. Pearce
Chas. A. Gauntt

Inventor's:
Louis J. Crecelius
Henry G. Sachleben (No Model.) 9 Sheets—Sheet 7.

L. J. CRECELIUS & H. G. SACHLEBEN.
BARB WIRE MACHINE.

No. 350,413. Patented Oct. 5, 1886.

Attest:

Inventors;

(No Model.) 9 Sheets—Sheet 9.

L. J. CRECELIUS & H. G. SACHLEBEN.
BARB WIRE MACHINE.

No. 350,413. Patented Oct. 5, 1886.

UNITED STATES PATENT OFFICE.

LOUIS J. CRECELIUS AND HENRY G. SACHLEBEN, OF ST. LOUIS, MISSOURI.

BARB-WIRE MACHINE.

SPECIFICATION forming part of Letters Patent No. 350,413, dated October 5, 1886.

Application filed March 17, 1886. Serial No. 195,612. (No model.)

*To all whom it may concern:*

Be it known that we, LOUIS J. CRECELIUS and HENRY G. SACHLEBEN, both of the city of St. Louis, in the State of Missouri, have invented a certain new and useful Improvement in Barb-Wire Machines, of which the following is a full, clear, and exact description, reference being had to the accompanying drawings, forming part of this specification, and in which—

Our invention relates to a machine for forming barbs on wires; and our invention consists in features of novelty hereinafter fully described, and pointed out in the claims.

Referring to the drawings, A represents the table of the machine, supported on suitable legs, A'.

Figure 1:
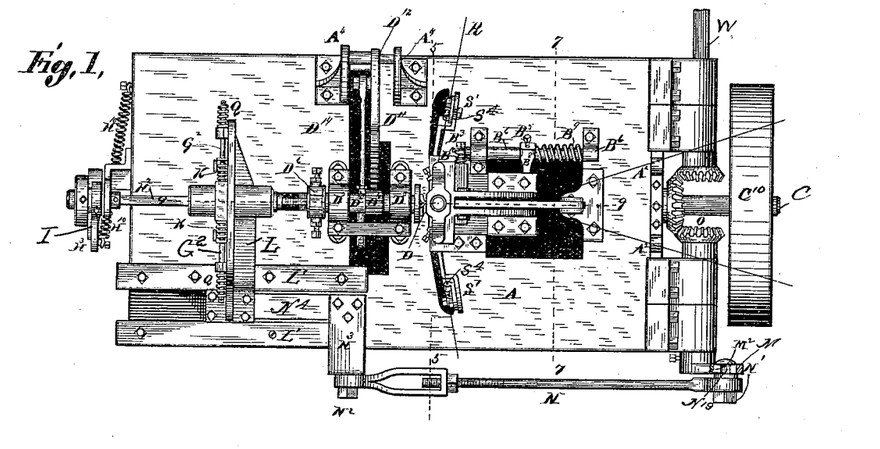
Figure 1 is a top view of our improved machine, showing the parts in the position they occupy just before the barb is commenced to be formed.
Figure 2:
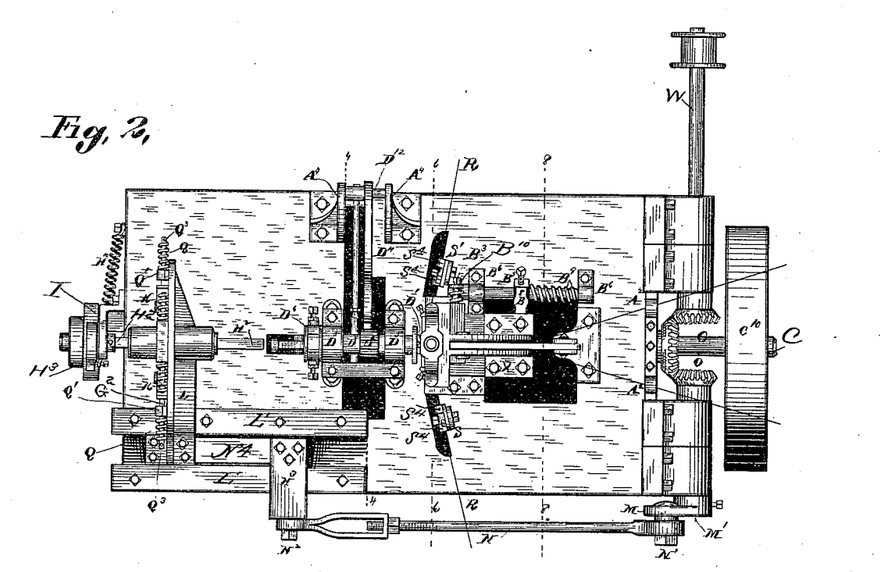
Fig. 2 is a like view showing the parts in a different position.
Figures 7, 8:
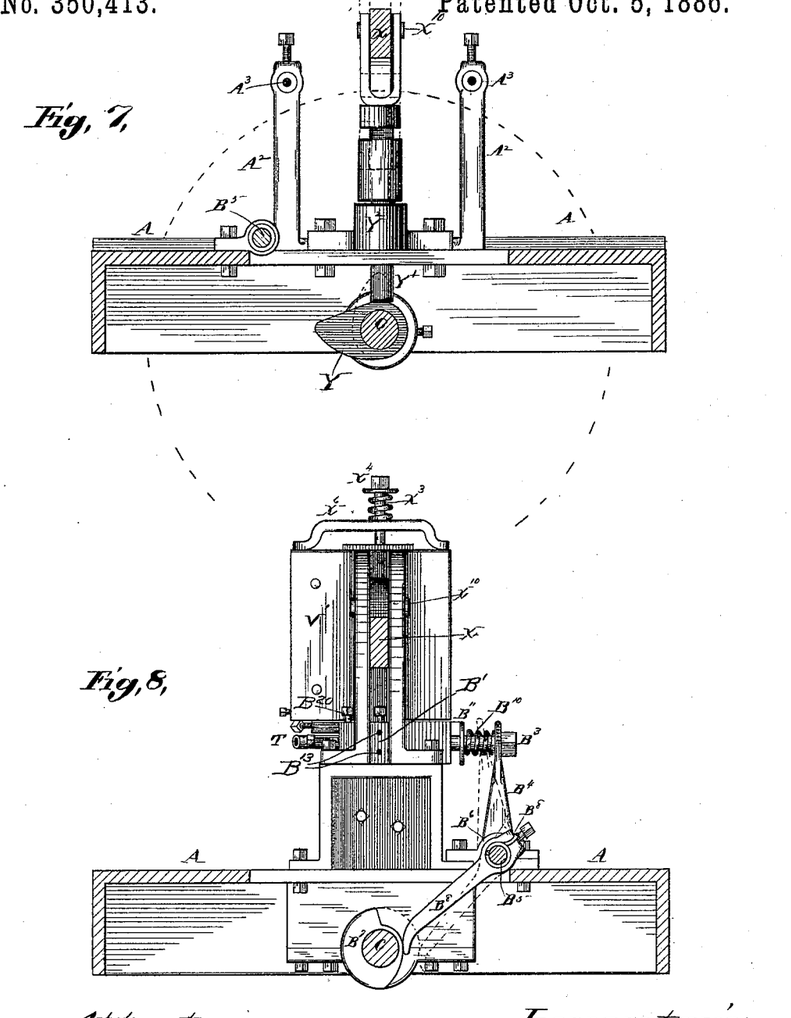
Fig. 7 is a similar view taken on line 7 7, Fig. 1.
Fig. 8 is a similar view taken on line 8 8, Fig. 2.
Figure 9:
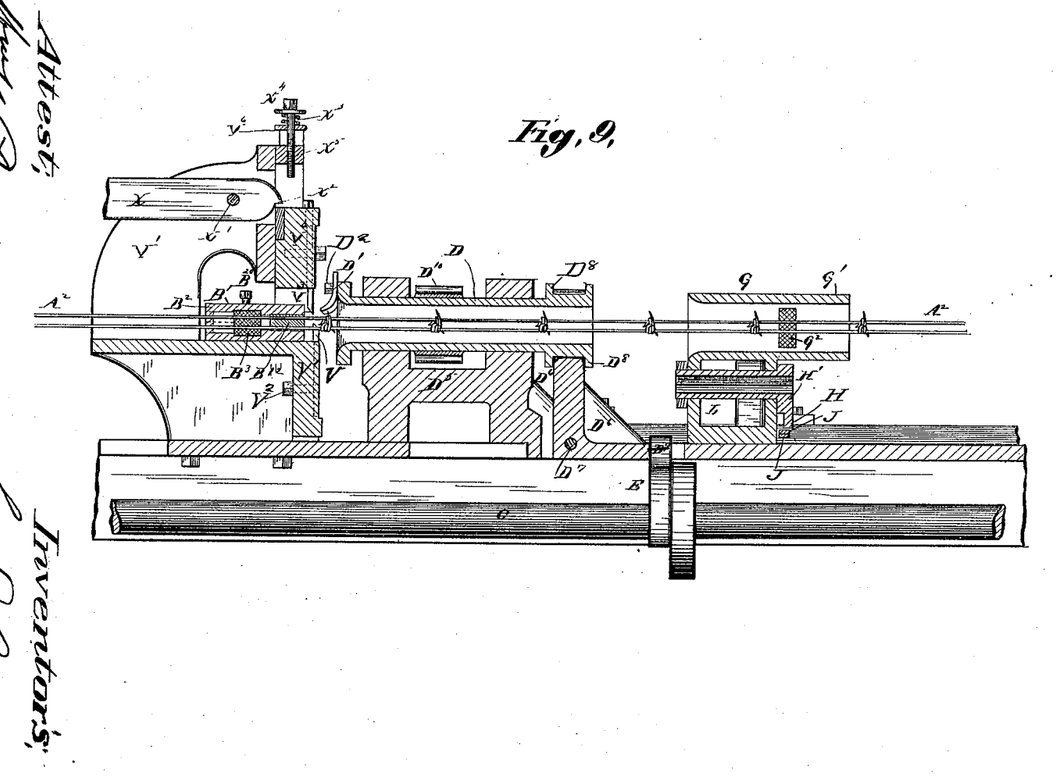
Fig. 9 is a longitudinal section taken on line 9 9, Fig. 1. These various sections show the parts in the same position they occupy in the Figs. 1 and 2, upon which the sections are taken.
Figures 10, 11:
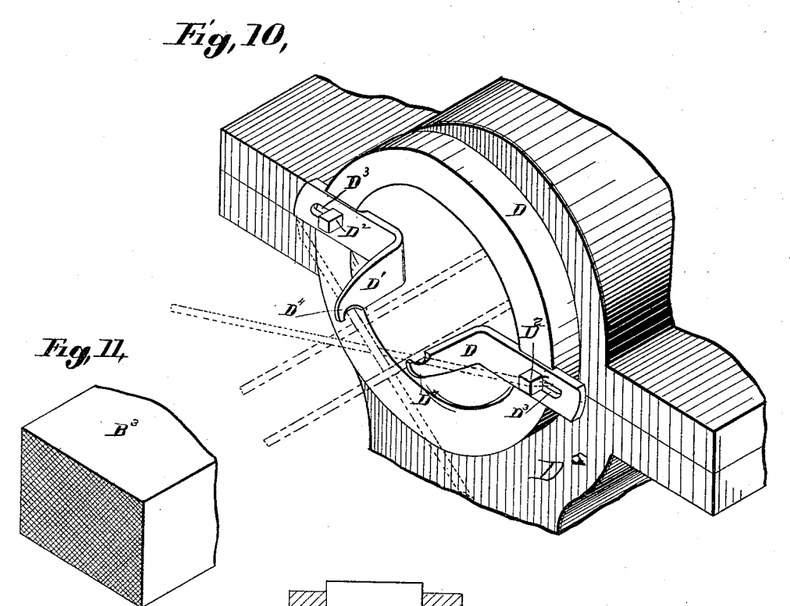
Fig. 10 is an enlarged detail perspective view of the former-head, showing the formers and the relative positions in dotted lines of the wires.
Fig. 11 is a detail perspective view of one of the clamp-bars for holding the strand-wires while the barbs are formed.
Figure 12:
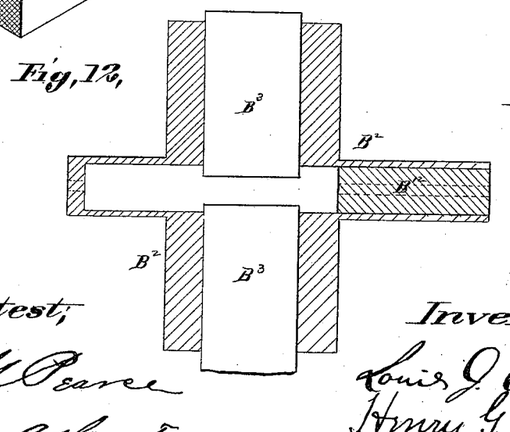
Fig. 12 is a longitudinal section of the holder containing the bushing, eyelets, and wire-holders, showing the inner ends of the clamp-bars.

$A^2$ represents the strand or main wires, passing from a suitable reel through a holder, B', supported on the frame of the machine, and provided with clamps $B^3$, the clamps grasping the wire at a certain time to hold it from movement in the tube. These clamps are serrated on their inner faces or ends, as shown in Fig. 11, and they fit in sockets in the part $B^2$, as shown in Fig. 12. One of them is forced inward at the proper time, the other being held stationary by a set-screw, $B^{20}$, (see Fig. 9,) by which it may be adjusted to suit wires of different sizes. The strand-wires are clamped by means of an arm, $B^4$, on a shaft, $B^5$, journaled in boxes $B^6$, secured to the frame of the machine, as shown in Figs. 1, 2, and 8. The shaft is turned to operate the arm and force the clamp inward by means of a cam, $B^7$, on a main driving-shaft, C. This cam has a single part, which bears against an arm or lever $B^8$ on the short shaft $B^5$. When the single part of the cam leaves the arm $B^8$, the shaft is rocked in the other direction, to cause the clamp to move outward and release the strand-wires by means of a spring, $B^9$, coiled upon shaft $B^5$, one end of which is secured to arm $B^4$ and the other to one of the boxes $B^6$ or to table of the machine.

To give a yielding effect between the clamps and wire we locate a spring, $B^{10}$, around the movable clamp, between arm $B^4$ and collar $B^{11}$ on the clamp. The effect of this is to allow the clamps to hold the wires with sufficient pressure to prevent slipping, and at the same time avoid mashing the wires, which may be of different sizes. The clamp thus accommodates itself to any-sized wires, and will hold one size with the same pressure as another.

Before passing through the clamp B' the main wires pass through guides $A^2$, as shown in Figs. 1, 2, and 7, the guides being provided with bushings $A^3$, perforated to receive the wires.

Figure 13:
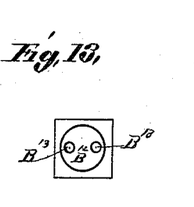
Fig. 13 is an end view of the bushing in its place.

The forward end of the holder is provided with a bushing, $B^{12}$, having holes or perforations $B^{13}$, (see Fig. 13,) for the passage of the wires. From this holder the strand-wires pass to and through a tube or spindle, D, to the forward end of which are secured the barb-formers D'. (Shown most plainly in Figs. 9 and 10.) The formers are secured to the front end of the spindle by bolts $D^2$, screwed into the spindle and fitting in slots $D^3$, made in the formers, the slots permitting of an adjustment of the formers to and from each other. Each former is angular in shape, as shown in Fig. 10, and has a recess, $D^4$, in its forward end, which receives the barb-wires as the barbs are being formed, as illustrated in Fig. 10, and the barb-wires are thus prevented from slipping off the formers as the barb is bent.

The spindle D is held in a suitable stationary head, $D^5$, and has a slight longitudinal movement. It is moved forward to cause the formers to grasp the barb-wires, and as the barb is formed the spindle recedes. The forward movement is given by a bell-crank lever, $D^6$, pivoted at $D^7$. The upper end of the lever is secured to the outer end of the spindle by flanges $D^8$, and embrace the upper end of the lever. It will be understood that as the lower end of the lever is raised its upper end will be moved forward, and will thus cause the forward movement of the spindle. To give this movement to the lever there is located upon the main shaft C a cam, E, (see Fig. 9,) which comes against a friction-roller, $D^9$, on the lower end of the lever. As the single part of the cam E bears against this friction-roller $D^9$, the lever will be raised, forcing the spindle forward, and as the single part of the cam leaves the roller $D^9$ the lever will assume its normal position again, allowing the spindle to recede, and the formers thus moving back give room for the barbs to be twisted upon the main wires at the same time the barbs are being made by the formers.

In order for the formers to make the barbs it is necessary that they should have a rotary movement. This is obtained by rotating the spindle D. The preferred manner of doing this is to secure a pinion, $D^{10}$, on the spindle, as shown in Figs. 1, 2, 4, and 9, which is engaged by a rack or segment, $D^{11}$, pivoted at $D^{12}$ to arms $A^4$, extending from the table of the machine. This rack is moved from the position shown in full lines, Fig. 4, to the position shown in dotted lines, Fig. 4, and vice versa. As it is moved in the first direction, the barbs are formed, and as it is moved back the spindle is returned to its normal position, when the formers are ready to receive and make another barb. As soon as the spindle is moved forward, the rack is operated by an eccentric, F, on the main shaft C, the rack having an extension, $D^{13}$, to which is secured one end of a pitman, $D^{14}$, by a bolt, $D^{15}$, fitting in a slot, $D^{16}$, of the extension or crank. The other end of the pitman is connected to the eccentric F by an ordinary ring, $D^{17}$. By shifting the bolt $D^{15}$ in the slot $D^{16}$ the throw of the rack $D^{11}$ may be regulated to cause the spindle D to be rocked more or less, as desired.

The action of the mechanism described for forcing the spindle D forward to cause the formers to engage the barb-wires, takes place just before the rack turns the spindle, to cause the formers to bend the barb-wires around the strand-wires, and then the spindle is allowed to recede, as stated. As the mechanism forces the spindle forward next time, the rack has returned the spindle to its former position, or, in other words, to the position shown in full lines, Fig. 4. As soon as a barb is formed, the clamps $B^3$ of the holder B' release the strand-wires by the single part of the cam $B^7$, leaving the arm $B^8$, and then the strand-wires are allowed to be moved forward by the mechanism which we will now describe.

Figure 16:
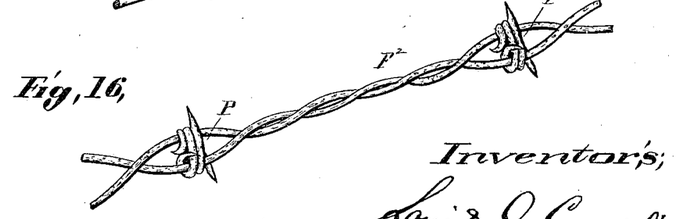
Fig. 16 is a similar view after the strand-wires are twisted.
Figure 18:
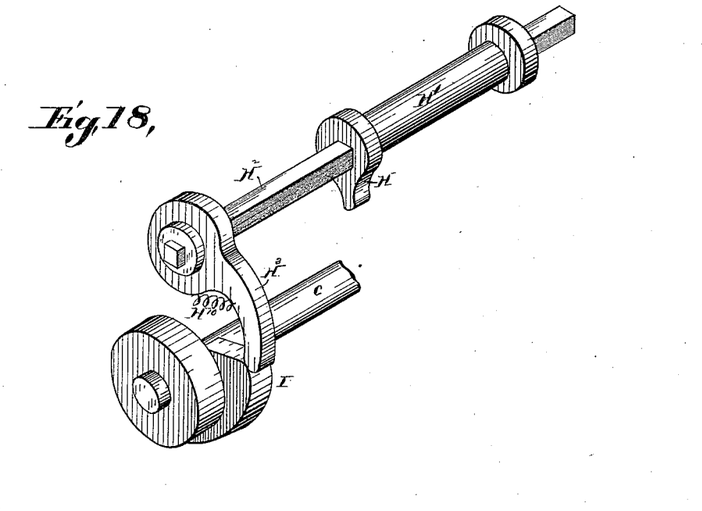
Fig. 18 is a detail perspective view illustrating the mechanism for operating the holders of the strand-wire feeder or drawer.
Figure 19:
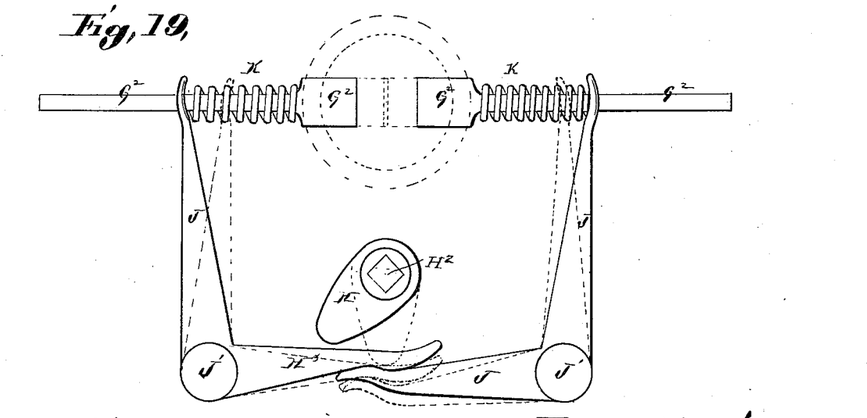
Fig. 19 is a diagram illustrating the holders and their operating-levers, the holders being shown open in full lines and closed in dotted lines.

G represents a feeder or drawer consisting of a tube or sleeve, G', and clamps $G^2$. The inner faces of the clamps are serrated the same as the inner faces of the clamps $B^3$, which have already been described, and they move inward to clamp the wires at the proper time by means of a cam, H, on a sleeve, H'. (See Fig. 18.) The sleeve fits over a non-circular rock-shaft, $H^2$, which is operated by an arm, $H^3$, thereon, against the lower end of which bears a cam, I, on the main shaft C. As the cam I rocks the shaft $H^2$ and sleeve H', the cam H bears against the inner ends of levers J, pivoted at J' to suitable supports, and forces them from the position shown in full lines, Fig. 19, to the position shown in dotted lines, same figure. The upper ends of the levers J fit over the outer parts of the clamps $G^2$, and between the levers and the heads of the clamp are spiral springs K. The action of the levers is to move the clamps inward and outward. When they are moved inward, they clamp the strand-wires in the feeder or drawer, and at the same instant the clamps $B^3$ release the wires in the holder B' and the feeder or drawer is moved forward by the longitudinal movement of the head L, in which the spindle or sleeve H' is held, and to which is also made fast, or formed upon, the tube G' of the feeder or drawer. (See Fig. 9.) This reciprocating movement of the head, and consequently the feeder or drawer, is effected by a crank, M, on a shaft, M', to which the head is connected by a pitman, N, and bolt N', the pitman being made fast to the head by a bolt, $N^2$, and extension $N^3$, as shown in Figs. 1 and 2. The shaft M is turned by being connected to the main shaft C by gear-wheels O. The main shaft C is provided with a driving-pulley, $C^{10}$. It will thus be understood that when the main shaft is turned the feeder or drawer, through means of the described connection, will have a reciprocating movement, and the action of the clamps in the holder and feeder or drawer, as described, is such that the former will release the wires as the latter grasp them, and vice versa, the clamps in the feeder or drawer grasping the wire just as the forward movement of the feeder or drawer takes place, and at this time the clamps in the holder release the barbs, and then the clamps in the feeder or drawer release the wires just as the feeder or drawer commences to recede, and at this point the clamps in the holder grasp the wires. The wires are thus held at all times by either one or the other of the clamps, and the slightest movement of one wire more than the other is not in the slightest degree permitted. The effect of this upon the strand-wires, when coiled, is of great practical advantage, in that the strand-wires being of a uniform length, and being held by the barbs, they are, when twisted, (which is done by a device not shown on this machine, as any form of twister may be used,) uniform in this opening, (indicated at P, Fig. 16,) where the barbs are attached. This is due to the fact that the wires being of exactly the same length, one (the softer of the two) is not allowed to coil upon the other; but the two are twisted uniformly, forming a perfect oval at P, thus adding also to their utility, in that in case of contraction in cold weather they contract uniformly, and one not being less twisted than the other, is not liable to be broken; and, moreover, in putting the wire into a fence, when it is stretched to make it taut no greater strain is brought upon one wire than upon the other, which is the case where one wire is coiled more than the other, as will be plainly understood.

When the clamps $G^2$ are released by the cam H, leaving the levers J, they (the clamps) are forced outward by springs Q, located between projections $Q'$ on the head L and pins $Q^2$ in the outer ends of the clamps. (See Figs. 1, 2, and 3.)

The springs K act to form a cushion effect between the arms J and clamps $G^2$, so that (as in case of the clamps $B^3$) these clamps $G^2$ grasp the wires with the same pressure, whether they be smaller or larger.

Figure 3:
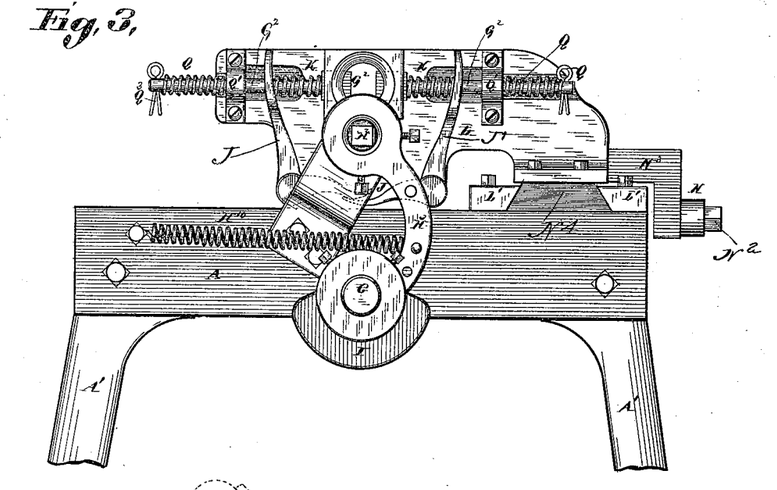
Fig. 3 is an end elevation.
Figure 4:
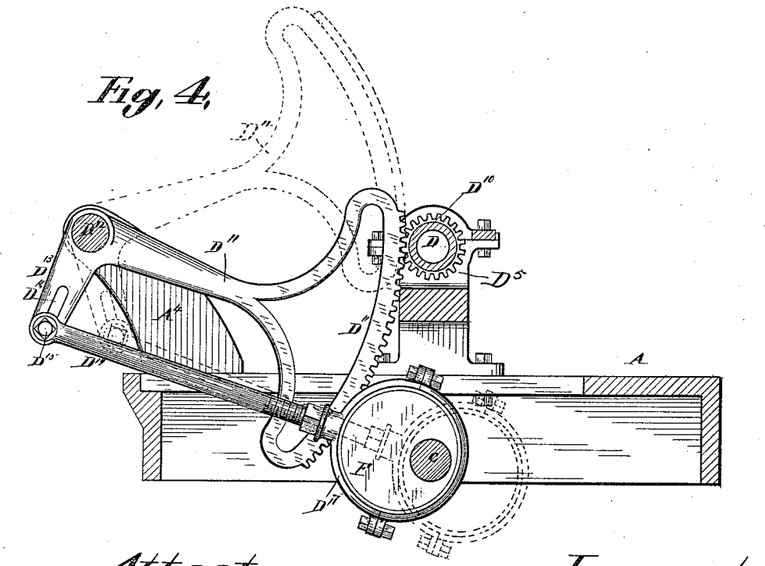
Fig. 4 is a transverse section taken on line 4 4, Fig. 2.

When the shaft $H^2$ and the arm $H^3$ are operated by the cam I, they are returned to their normal position by a spring, $H^{10}$, connecting the arm $H^3$ to the table of the machine, as shown in Figs. 1, 2, and 3.

The head L is mounted upon a dovetailed base, $N^4$, held to the table A by blocks $L'$, (see Fig. 3,) or it may be connected in any other suitable manner.

From the feeder or drawer the wires pass to any suitable spooling mechanism; or they may, if desired, pass to a twister. It is preferred, however, to spool them on a separate machine.

R represents the barb-wires, which are passed from suitable reels to feeders S, composed of bell-crank levers $S'$, pivoted at $S^2$ to hangers $S^3$, depending from the under side of the table of the machine. On the upper ends of the levers are secured tubes $S^4$, through which the wires pass. These tubes are made open at $S^5$, and in this open space of each tube fits the free end of a dog, $S^6$. (See Figs. 5, 6, and 17.) The dogs are pivoted at $S^7$ to the upper ends of the levers $S'$, and their lower ends come against the wires, where they are held by springs $S^8$. The lower points of the dogs are so shaped that they will allow the tubes to slip over the wires as the levers move from the position shown in Fig. 6 to that shown in Fig. 5, and then, as the levers are moved in the opposite direction, the dogs grasp the wires and feed them forward, forcing them through tubes T. The springs $S^8$ are connected to the upper ends of the dogs at $S^9$, and their lower ends fit behind the bolts $S^{10}$, that connect the tubes to the upper ends of the levers.

Figure 5:
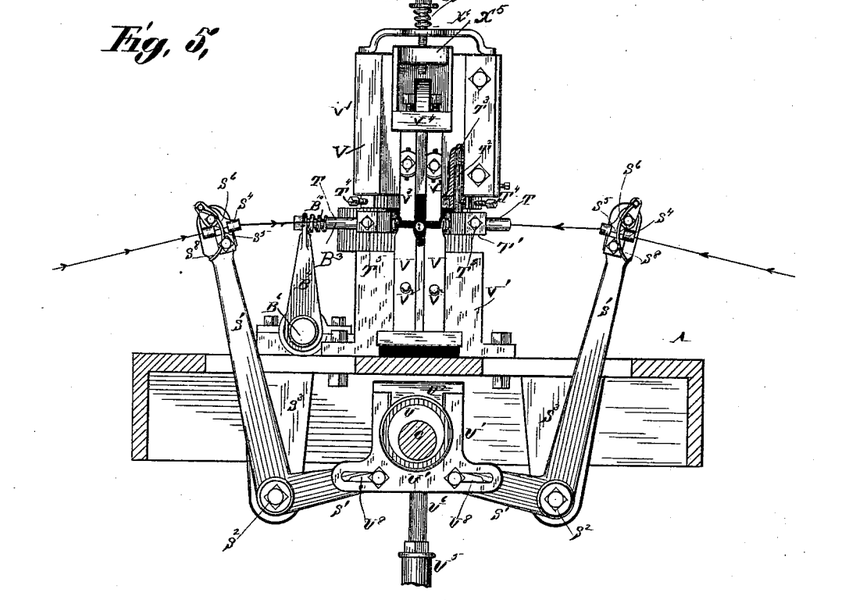
Fig. 5 is a similar view taken on line 5 5, Fig. 1.
Figure 6:
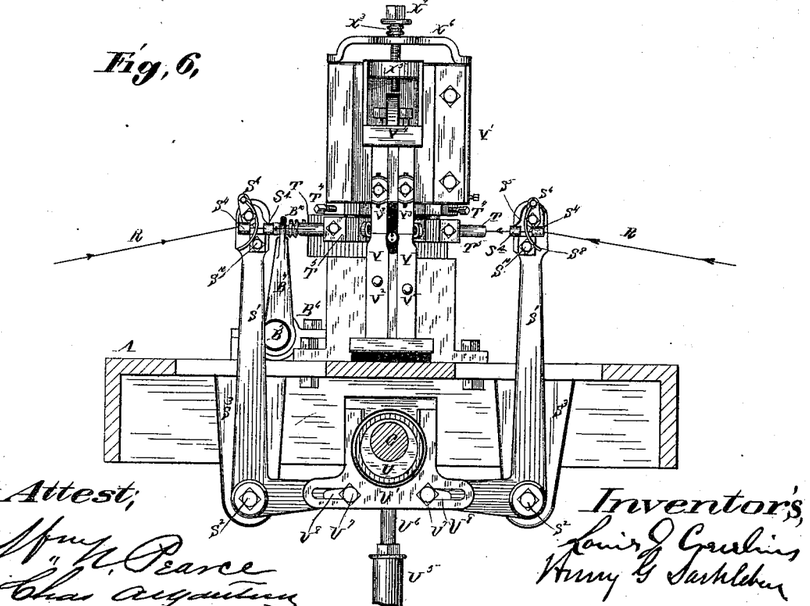
Fig. 6 is a similar view taken on line 6 6, Fig. 2.
Figure 14:
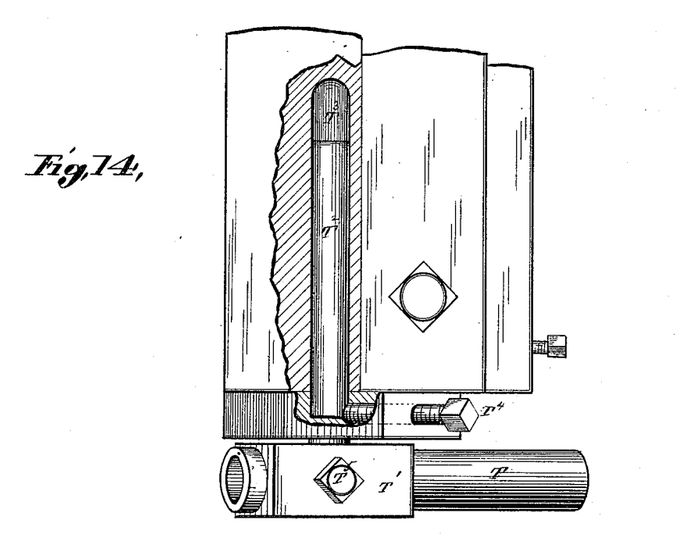
Fig. 14 is an enlarged detail perspective view, partly in section, illustrating the barb-wire guide-holder and guides and the manner of their adjustment.
Figure 15:
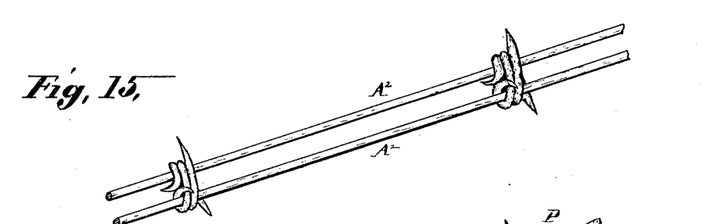
Fig. 15 is a view of the manufactured article before the strand-wires are twisted.

The levers are operated from the position shown in Fig. 5 to that shown in Fig. 6, and vice versa, by means of a cam, U, on the shaft C. Outside of this cam fits a U-shaped frame, $U'$. (Shown in Figs. 5, 6, and 17.) The arms of the frame are far enough apart so that the cam U never touches them; but the cam does bear upon the bottom of the frame, and upon a top piece, $U^2$, secured to the frame by bolts $U^3$. The bottom of the top piece fits between the arms of the frame, and lugs $U^4$ rest upon the top of the frame, and through these lugs pass connecting-bolts. The frame is supported on a sleeve, $U^5$, through which passes a stem, $U^6$, formed upon or secured to the bottom of the frame. The frame is permitted to rise and fall alternately as the cam bears upon the bottom or top of it, and as it is lowering the levers $S'$ are moved from the position shown in Fig. 5 to that shown in Fig. 6, and the barb-wires are at this time moved forward, and as the frame rises the levers are moved in the reverse direction. The levers are connected at their lower inner ends by bolts $U^7$, fitting in slots $U^8$, made in the frame and in the levers. The slots permit of the bolts being moved to or from the pivot-points of the upper ends of the levers, and, consequently, the forward movement of the barb-wires is regulated. As already stated, the barb-wires pass from the feeders to and through tubes T, which guide and direct them across the strand-wires, as shown in Fig. 10. The tubes are made vertically adjustable, so as to raise or lower the wires. In this manner the wires are kept in close contact with the stationary knives V, but are not allowed to touch these knives in their forward movement, which would result in injuring the knives by dulling them. The tubes are made vertically adjustable by fitting in s'ots in the tube-holder $T'$, extending upward from which are stems $T^2$, fitting in sockets $T^3$ in the cutter-head. The blocks may be moved to any adjustment by set-screws $T^4$, passing through the head and jamming against the stems $T^2$, as shown on one side of Fig. 14. The tubes are held on the blocks by set-screws $T^5$, or by other suitable means, if desired. It will thus be seen that the tubes can be adjusted to any vertical position. They should also be arranged as to be adjustable horizontally, so as to direct the wires across the main wires. This is permitted by the construction described, as by loosening the set-screws T⁴ the blocks may be turned to adjust the tubes to any angle. By tightening the set-screws the tubes are held to the same angles.

The knives V are secured to the cutter-head V' by bolts or set-screws V². Above these stationary knives are movable knives V³, secured to a sliding block, V⁴, the block being dovetailed into the head V'. The movable knives are operated to cut the wires against the stationary knives by means of a lever pivoted at X' to the head V', the forward end of the lever having a lip, X², that fits over the block V⁴, carrying the knives V³. As this end of the lever is depressed, the block V⁴ is also depressed, causing the movable knives to cut the wires to reach the stationary knives, and as this end of the lever rises the block is carried back by means of a spring, X³, located over the upper end, V⁶, of the head V', and surrounding a bolt, X⁴, which passes through the upper end of the head V' and into a cross-bar, X⁵, of the block V⁴. The bolt X⁴ may be screwed into the cross-bar X⁵ more or less, to limit the movement of the block V⁴ or to compensate for wear of the knives. The lever X is operated by means of a cam, Y, secured to the shaft C, (see Fig. 7,) against which rests the lower end of a pin, Y', passing upward through a box, Y², on the table of the machine, and to the upper end of which is secured, through a yoke, X¹³, a lever, X, by a pin, X¹⁰. This pin Y' is in two parts, so that it may be lengthened or shortened for adjustment. The lever is thus raised to lower the movable knives, and as soon as the single part of the cam leaves the pin Y' the lever resumes its normal position, owing to the weight of the pin Y'.

Figure 17:
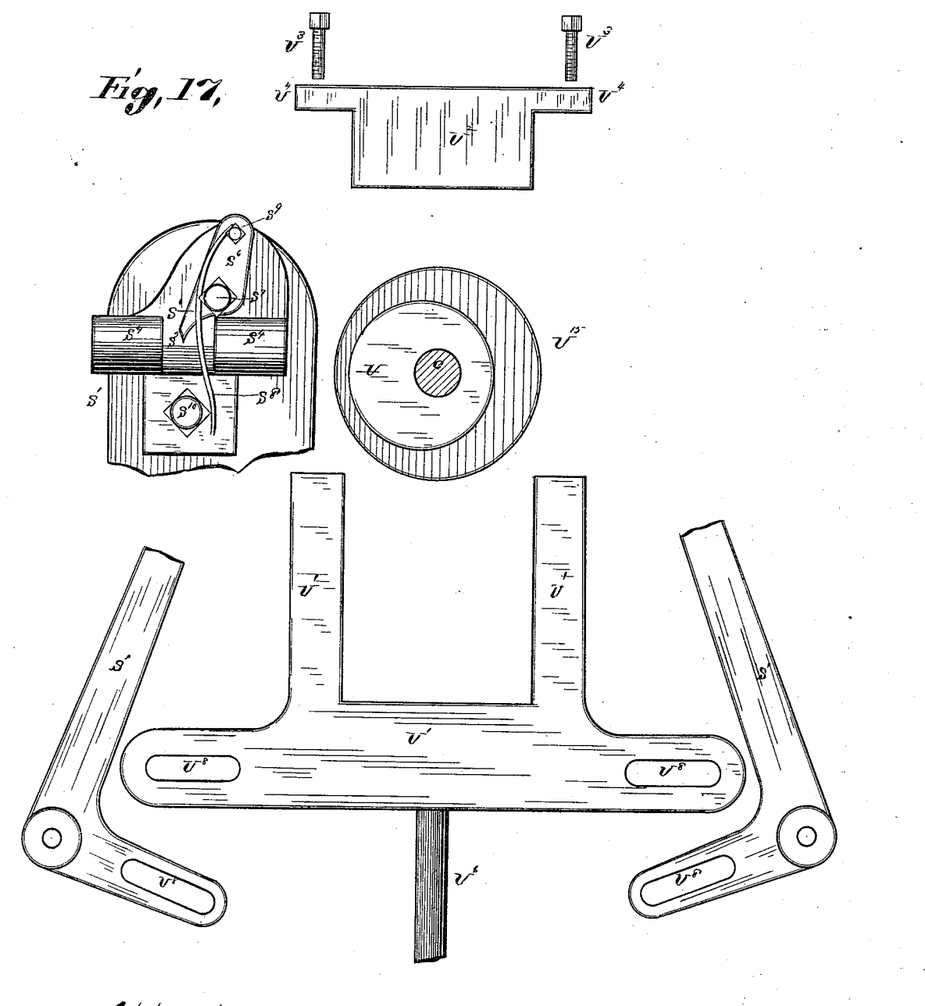
Fig. 17 is a diagram illustrating the various parts disconnected of the eccentric and its adjacent parts for operating the barb-wire feeders.

It is proper to state that the cog-wheel D¹⁰ is elongated, so that the movement of the spindle D will not disengage this cog-wheel from the rack D¹¹. It is also proper to state that in Fig. 17 the upper end of the lever S', to which the dog S⁶ and tube S⁴ are secured, is on a much larger scale than the lower parts of the levers, the object being to show as clearly as possible the operation and the form of the dogs and tubes. On the shaft C, in this Fig. 17, is shown a disk, U¹⁵, which fits outside of the frame U', and holds the frame from lateral movement.

The crank to which the pitman N is connected at one end has a slot, M², (see Fig. 1,) to receive the connecting-bolt N¹⁹, and by simply shifting or changing the position of this bolt in the slot the throw of the feeder is regulated at will, and by changing the throw of the feeder the barbs will be placed at any desired distance apart on the strand-wires. If the throw is increased, the strand-wires will be moved farther at each forward movement of the head, and consequently the barbs will be placed farther apart on the strand wires, and if the throw of the feeder or drawer is decreased the strand-wires will be moved forward a less distance each forward movement of the feeder or drawer, and consequently the barbs will be placed nearer together on the strand-wires. The machine can thus be changed by simply moving the bolt N¹⁹, without any practical loss of time from making what is known as "cattle-wire," where the barbs are far apart, to what is known as "hog-wire," where the barbs are close together, and vice versa, and, in fact, the parts may be adjusted to such a nicety that the barbs can be placed any distance apart desired. In Figs. 1 and 2 we have shown, incidentally, a shaft, W, connected with a beveled gear on the shaft C, which in practice may be used to communicate motion to the spooling device at the opposite end of the machine.

With our machine there can be manufactured barb-wire, forming the four-point barb perfectly, substantially, and firmly upon two-strand wires without twisting the cable or strand-wires, and placing the barbs at any distance apart desired, and without first spooling the wires and swinging the spools with the machine, the wire with the barb so formed being twisted afterward on a separate machine, the machine being therefore easy to run and regulate; it makes a beautiful barb-wire, giving an equal strain or strength to both strand-wires, with an even loop on both sides of the barb, which, in stretching the barbed wire, allows of lateral motion of the barb or strand wire, at the same time holding it firmly.

Our machine has a stationary head or holder where the barb is formed and the wires are afterward cut. The barb-wire is fed intermittingly into the machine, as described, and the knives do not operate to cut the same until the movement of the feeding devices has ceased and the wires are held stationary, and thus the barb-wire does not rub against the knife-edges, as in other machines, where the barb-wire is fed continuously. Holding the cable or strand-wires in the head perfectly solid and stationary while the barb is being formed around the same always insures a perfect barb. The barb finger or formers have a reciprocating motion, wrapping the wires around the strands, thus differing from machines where the motion of the head carries the barbs around stationary barb-fingers in such manner as to conform with the construction of the barbs. By placing in a firm and substantial manner the barbs on two parallel strand-wires without twisting said wires the use of strand-wires of various thickness and quality is allowed, thus always insuring equal strength or tension of strand-wires. The feeder or drawer can be regulated to travel any distance desired, so that the barbs can be put on uniformly, either one, two, three, four, five, or six inches apart, or any other distance required or desired. The strand, as well as the barb-wires are fed from the coils as received from the mills; hence, by reason of the wire not being spooled and not swinging, power and labor are saved, and even life, as serious accidents frequently occur by swinging the spools.

The strand-wires are held on spools at each end of the machine, and are thus kept taut; but the spools not being swung by the machine the difficulties mentioned are not met with.

By changing the position of the two strand-wires and omitting one barb-wire a perfect two-point wire can be made without twisting, and the barbs thereon likewise can be placed at any distance desired.

We claim as our invention—

1. In a barb-wire machine, mechanism for forming the barbs upon the strand-wires, in combination with mechanism on both sides of such barb-forming mechanism for alternately grasping and holding the strand-wires, substantially as set forth.

2. In a barb-wire machine, the combination of mechanism for holding the strand-wires, mechanism for forming the barbs upon the strand-wires, and a feeder provided with clamps for grasping the strand-wires and moving them forward, and means for releasing the holding mechanism from the strand-wires as they are grasped by the feeder, substantially as set forth.

3. In a barb-wire machine, a holder provided with clamps, barb-forming mechanism, and a feeder provided with clamps, and several means for alternately operating the clamps of the holder and of the feeder, whereby the strand-wires are intermittingly fed through the machine, substantially as described.

4. In a barb-wire machine, a holder consisting of a tube, B', and clamps B³, one of the clamps being moved to grasp the strand-wires by means of arms on a rock-shaft and a cam on the main shaft, substantially as and for the purpose set forth.

5. In a barb-wire machine, a feeder consisting of a tube and clamps, the clamps being operated to grasp the strand-wires by means of bell-crank levers and a cam on an operating-shaft, substantially as and for the purpose set forth.

6. In a barb-wire machine, a feeder consisting of clamps, bell-crank levers adapted to operate said clamps to grasp the strand-wires, a cam for operating said levers, and a separate mechanism, substantially as described, for moving the feeder longitudinally while the clamps hold the wires, substantially as described.

7. In a barb-wire machine, a feeder consisting of clamps, bell-crank levers adapted to operate said clamps to grasp the strand-wires, a cam for operating said levers, and mechanism for moving the feeder longitudinally, consisting of a pitman, N, connected at one end to the moving base of the feeder and at the opposite end adjustably to a crank-arm, M, whereby the movement of the feeder may be regulated, substantially as described.

8. In a barb-wire machine, the combination of a sliding head carrying the tube G and cam G², sleeve H', secured to the head carrying cam H, non-circular shaft H², over which the sleeve fits, arm H³ on the shaft, and cam I on the operating-shaft, for the purpose of closing the clamps of the feeder, substantially as described.

9. In a barb-wire machine, mechanism for forming the barbs upon the strand-wires, consisting of a spindle to which the formers are secured, an elongated pinion on said spindle, an operating-rack meshing into the spindle, a bell-crank lever connected to the spindle, and a cam on the main shaft of the machine for operating the lever to reciprocate the spindle, substantially as and for the purpose set forth.

10. In a barb-wire machine, the combination of the stationary knives, movable knives, sliding head to which the movable knives are secured, pivoted lever X, and mechanism consisting of the pin Y' and cam Y, for operating the lever, substantially as and for the purpose set forth.

11. In a barb-wire machine, the combination of the mechanism for feeding the barb-wires, consisting of bell-crank levers provided with tubes and clamps on their upper ends to hold the wires, and a sliding block at their lower ends with which they are connected by bolts passing through slots, and a cam on the operating-shaft for moving the block, as set forth.

12. In a barb-wire machine, a fixed immovable holder having clamps and means for intermittingly operating the clamps to grasp the strand-wires, in combination with mechanism for forming the barbs upon the wires, substantially at set forth.

LOUIS J. CRECELIUS.
HENRY G. SACHLEBEN.

Witnesses:
WM. N. PEARCE,
CHAS. ADJANTINE.